US011620600B1

(12) United States Patent
Rao et al.

(10) Patent No.: US 11,620,600 B1
(45) Date of Patent: Apr. 4, 2023

(54) APPARATUSES AND METHODS FOR IMPROVED RISK MANAGEMENT

(71) Applicant: Wells Fargo Bank, N.A., San Francisco, CA (US)

(72) Inventors: Abhijit Rao, Irvine, CA (US); Masoud Vakili, Los Altos, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1074 days.

(21) Appl. No.: 16/281,295

(22) Filed: Feb. 21, 2019

Related U.S. Application Data

(60) Provisional application No. 62/768,398, filed on Nov. 16, 2018.

(51) Int. Cl.
*G06F 21/30* (2013.01)
*G06Q 10/06* (2023.01)
*G06Q 10/0635* (2023.01)
*G06F 16/903* (2019.01)
*G06Q 30/018* (2023.01)
(Continued)

(52) U.S. Cl.
CPC ....... *G06Q 10/0635* (2013.01); *G06F 16/903* (2019.01); *G06F 21/30* (2013.01); *G06Q 30/018* (2013.01); *G06Q 50/265* (2013.01); *H04L 63/102* (2013.01)

(58) Field of Classification Search
CPC ............ G06Q 10/0635; G06Q 30/018; G06Q 50/265; G06F 16/903; G06F 21/30; H04L 63/102
See application file for complete search history.

(56) References Cited

U.S. PATENT DOCUMENTS 9,166,999 B1\* 10/2015 Kulkarni ................. G06F 21/31
9,871,779 B2\* 1/2018 Sheller .................... H04L 63/08
2003/0154406 A1 8/2003 Honarvar et al.
(Continued)

OTHER PUBLICATIONS

"Digital Identity Guidelines"—Grassi et al, NIST Special Publication 800-63, Jun. 2017 https://pages.nist.gov/800-63-3/sp800-63-3.html (Year: 2017).\*
(Continued)

*Primary Examiner* — Randy A Scott
(74) *Attorney, Agent, or Firm* — Womble Bond Dickinson (US) LLP

(57) ABSTRACT

A method, apparatus, and computer program product for improved risk compliance management are provided. An example method includes receiving, by a computing device, a request for an authenticated online session. The method further includes obtaining, by identification circuitry of the computing device, one or more first risk parameters associated with a first session establishment process. The one or more first risk parameters are associated with a first vendor performing the first session establishment process. The method further includes determining, by risk compliance circuitry of the computing device, if the one or more first risk parameters satisfy one or more first risk thresholds. In response to this determination, the method includes modifying, by risk adjustment circuitry of the computing device, one or more second risk thresholds associated with a second session establishment process to be performed by a second vendor.

19 Claims, 6 Drawing Sheets

(51) Int. Cl.
*G06Q 50/26* (2012.01)
*H04L 9/40* (2022.01)

(56) References Cited

U.S. PATENT DOCUMENTS

| | | |
|---|---|---|
| 2005/0209876 A1 | 9/2005 | Kennis et al. |
| 2012/0109802 A1* | 5/2012 | Griffin .................. G06Q 40/08 705/35 |
| 2014/0189829 A1* | 7/2014 | McLachlan ........ G06Q 20/4014 726/6 |
| 2015/0373007 A1 | 12/2015 | Sheller et al. |
| 2016/0164922 A1 | 6/2016 | Boss et al. |
| 2016/0182556 A1 | 7/2016 | Tatourian et al. |
| 2017/0230351 A1 | 8/2017 | Hallenborg |
| 2017/0346851 A1 | 11/2017 | Drake |
| 2018/0039785 A1 | 2/2018 | Naqvi et al. |

OTHER PUBLICATIONS

"Risk Management Guide for Information Technology Systems"—Stoneburner et al, Recommendations of NIST, Jul. 2002 https://www.hhs.gov/sites/default/files/ocr/privacy/hipaa/administrative/securityrule/nist800-30.pdf (Year: 2002).*

* cited by examiner

APPARATUSES AND METHODS FOR IMPROVED RISK MANAGEMENT

CROSS-REFERENCE TO RELATED APPLICATIONS

This application claims the benefit of U.S. Provisional Application No. 62/768,398, filed Nov. 16, 2018, which is hereby incorporated by reference.

TECHNOLOGICAL FIELD

Example embodiments of the present invention relate generally to risk management and, more particularly, to the use of modified risk thresholds to improve risk compliance.

BACKGROUND

The process for establishing sessions between entities often requires various vendors or providers to perform different tasks in the process. Each step in the establishment process may provide inherent risk based upon the ways in which the step is protected. Furthermore, the protection for each step may vary amongst vendors and may vary for the same vendor over time.

BRIEF SUMMARY

Traditional methods for monitoring and managing risk compliance have become increasingly rigid despite the increasing ease of access and flexibility offered by advancing computing resources. Furthermore, these conventional methods fail to adapt to emerging authentication processes (e.g., continuous authentication, biometric authentication, and the like). For example, in establishing a secure session with a financial institution (e.g., banking entity, credit union, or the like) separate vendors may be used to complete each step in the authentication process such that each of these steps provide varying levels of susceptibility to attack. While traditional systems attempt to monitor these susceptibilities, they fail to adapt to the ever-changing risks associated with each vendor, new threats, and changing session establishment processes (e.g., authentication, liveness detection, etc.). This process is further complicated by the fact that vendors used in the process are often removed or replaced due to business concerns (e.g. cost, ease of use, etc.) such that risk compliance or susceptibility for steps in the process (e.g., provided by a new vendor) are initially unknown.

To solve these issues and others, example implementations of embodiments of the present invention may utilize a risk management sever to provide improved risk compliance. Embodiments of the present disclosure provide improved risk monitoring and compliance by obtaining first risk parameters associated with a first session establishment process and associated first vendor performing said process. These first risk parameters are compared with one or more first risk thresholds and, based upon the outcome, are used to modify second risk thresholds associated with a second session establishment process and/or second vendor performing said process. In doing so, such example implementations confront and solve at least two technical challenges: (1) they reliably monitor and store risk compliance amongst various vendors performing distinct session establishment processes, and (2) they dynamically adapt to ever-changing threats to each step in session establishment.

Systems, apparatuses, methods, and computer program products are disclosed herein for providing improved risk management and compliance. In one embodiment, with reference to the claimed method, a method for dynamic risk compliance management in establishment of an online session is provided. The method may include receiving, by a computing device, a request to establish an authenticated online session, where the session is established upon completion of at least a first session establishment process and a second establishment process. The method may include obtaining, by identification circuitry of the computing device, one or more first risk parameters associated with a first session establishment process. The one or more first risk parameters may be associated with a first vendor performing the first session establishment process. The method may also include determining, by risk compliance circuitry of the computing device, if the one or more first risk parameters satisfy one or more first risk thresholds. The method may further include modifying, by risk adjustment circuitry of the computing device, one or more second risk thresholds associated with a second session establishment process to be performed by a second vendor.

In some embodiments, the one or more first risk thresholds may be associated with the first session establishment process. In other embodiments, the one or more first risk thresholds may be associated with the first vendor.

In some cases, modifying the one or more second risk thresholds, in an instance in which the one or more first risk parameters fail to satisfy the one or more first risk thresholds, may include increasing the one or more second risk thresholds.

In other cases, modifying the one or more second risk thresholds, in an instance in which the one or more first risk parameters satisfy the one or more first risk thresholds, may include decreasing the one or more second risk thresholds.

In an instance in which the one or more first risk parameters fail to satisfy the one or more first risk thresholds, the method may include completing the first session establishment process with a third vendor, wherein one or more third risk parameters associated with the third vendor satisfy the one or more first risk thresholds.

In some embodiments, the method may further include obtaining, by the identification circuitry of the computing device, one or more second risk parameters associated with the second session establishment process, wherein the one or more second risk parameters are associated with the second vendor performing the second session establishment process. The method may further include determining, by the risk compliance circuitry of the computing device, if the one or more second risk parameters satisfy the modified one or more second risk thresholds. In an instance in which the one or more second risk parameters satisfy the one or more modified second risk thresholds, the method may include establishing, by the computing device, the session.

In some cases, determining if the one or more first risk parameters satisfy the one or more first risk thresholds associated with the first vendor includes querying, by the identification circuitry of the computing device, a risk compliance database. In response to querying the risk compliance database, the method may include receiving a transmission from the risk compliance database that include the one or more first risk thresholds. The method may further include comparing, by the risk compliance circuitry of the computing device, the one or more first risk parameters with the one or more first risk thresholds, and transmitting the one or more first risk parameters to the risk compliance database.

In such and embodiment, the method may further include iteratively transmitting the one or more first risk parameters to the risk compliance database, and iteratively receiving a composite risk rating associated with the first vendor. In such an embodiment, the method may still further include comparing, by the risk compliance circuitry of the computing device, the composite risk rating associated with the first vendor with the one or more first risk thresholds.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
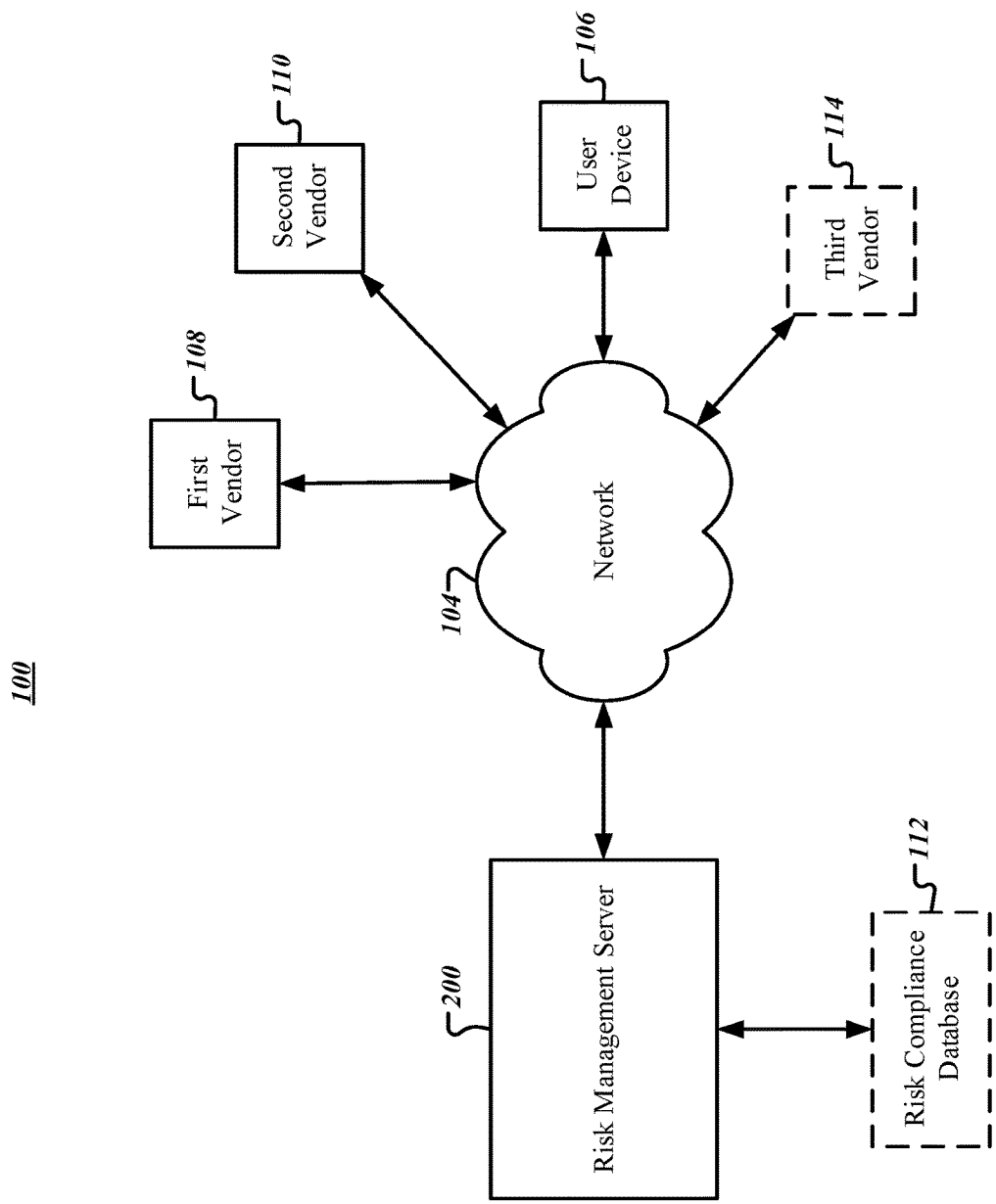
FIG. 1 illustrates a system diagram including devices that may be involved in some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a risk management server as an example "apparatus." However, elements of the apparatus described herein may be equally applicable to the claimed method and computer program product. Thus, use of any such terms should not be taken to limit the spirit and scope of embodiments of the present invention.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refers to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "user device," "mobile device," "electronic device" and the like refer to computer hardware that is configured (either physically or by the execution of software) to access one or more services made available by a risk management server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with chip of other electronic device that is configured to communicate with the external device via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the risk management server 200 or other computing device via a network.

As used herein, the term "vendor," "first vendor," "second vendor," "third vendor," and "vendor device" refers to any object, device, or system which may be in network communication with the user device and/or the risk management server 200. For example, a vendor and associate vendor device may be an external server or computing device (e.g., associated with a corporation, service provider, or other $3^{rd}$ party) that may request, receive, and/or provide data to or from one of the devices described above. By way of a more particular example, a vendor may include a server, online vendor, or the like configured to perform a session establishment process in establishing a session between a financial institution, corporation, or other entity, and a user (e.g., user device).

As used herein, the term "risk compliance database" refers to a data structure or repository for storing risk parameters, risk thresholds, and the like. In some embodiments, the risk compliance database may further store composite risk ratings associated with vendors (e.g., first vendor, second vendor, vendor device, etc.). The risk compliance database may be accessible by one or more software applications of the user device and/or risk management server.

As used herein, the term "risk parameters," "first risk parameters," "second risk parameters" and the like refer to data, metrics, or the like associated with of one or more procedures, steps, processes, or the like of a vendor performing a session establishment process. By way of example, a risk parameter may refer to a confidence factor of a first vendor in performing biometric authentication.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

As used herein, the terms "session," "online session," "authenticated online session," and "authenticated session" may be used interchangeably to refer to secured connections between user devices, vendors (e.g., vendor devices), and/or one or more entities of the risk management server 200. In some embodiments, the risk management server 200 and/or the one or more vendors may operate to (via one or more session establishment processes) established a secure session (e.g., connection) between one or more of the foregoing devices or entities. Furthermore, one or more biometric features of a user may also be utilized by the embodiments described herein so as to authenticate a session. As would be evident to one of ordinary skill in the art in light of the present disclosure, such a session may be referred to as an "authenticated biometric session," "a facial biometric session," or the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., a risk management server 200) communicably connected via a network 104 to a user device 106, a first vendor 108, a second vendor 110, and, in some embodiments, a third vendor 114. The example system 100 may also include a risk compliance database 112 that may be hosted by the risk management server 200 or otherwise hosted by devices in communication with the risk management server 200.

The risk management server 200 may include circuitry, networked processors, or the like configured to perform some or all of the apparatus-based (e.g., risk management server-based) processes described herein, and may be any suitable network server and/or other type of processing device. In this regard, risk management server 200 may be embodied by any of a variety of devices. For example, the risk management server 200 may be configured to receive/transmit data (e.g., risk parameter and/or threshold data) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs, but will nevertheless include at least the components illustrated in FIG. 2 and described in connection therewith. In some embodiments, the risk management server 200 may be located remotely from the user device 106, first vendor 108, second vendor device 110, and/or risk compliance database 112, although in other embodiments, the risk management server 200 may comprise the user device 106, first vendor 108, second vendor 110, and/or risk compliance database 112. The risk management server 200 may, in some embodiments, comprise several servers or computing devices performing interconnected and/or distributed functions. Despite the many arrangements contemplated herein, the risk management server 200 is shown and described herein as a single computing device to avoid unnecessarily overcomplicating the disclosure. In some embodiments, one or more components of the risk management server 200 may be wholly or partially housed within one or more of the user device 106, the first vendor 108 (e.g., one or more vendor devices associated with the first vendor), or the second vendor 110 (e.g., one or more vendor devices associated with the second vendor).

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The user device 106 may be a cellular telephone (e.g., a smartphone and/or other type of mobile telephone), laptop, tablet, electronic reader, e-book device, media device, wearable, smart glasses, smartwatch, or any combination of the above. Although a single user device is shown, the example system 100 may include any number of user devices.

The first vendor 108, the second vendor 110, and the third vendor 114, as defined above, may each be associated with any entity that is configured to facilitate, participate in the facilitation of, and/or perform a session establishment process. By way of example, the first vendor 108 (i.e., any number of vendors) may include an online vendor, application provider, or other $3^{rd}$-party configured to be in secure communication with the user device 106 via the network 104 (e.g., an authenticated session). Although three (3) vendors are shown, the example system 100 may include any number of vendors.

The risk compliance database 112 may be stored by any suitable storage device configured to store some or all of the information described herein (e.g., memory 204 of the risk management server 200 or a separate memory system separate from the risk management server 200, such as one or more database systems, backend data servers, network databases, cloud storage devices, or the like provided by an vendor device (e.g., online vendor or $3^{rd}$ party provider) or the user device 106). The risk compliance database 112 may comprise data received from the risk management server 200 (e.g., via a memory 204 and/or processor(s) 202) or the user device 106, and the corresponding storage device may thus store this data.

Figure 2:
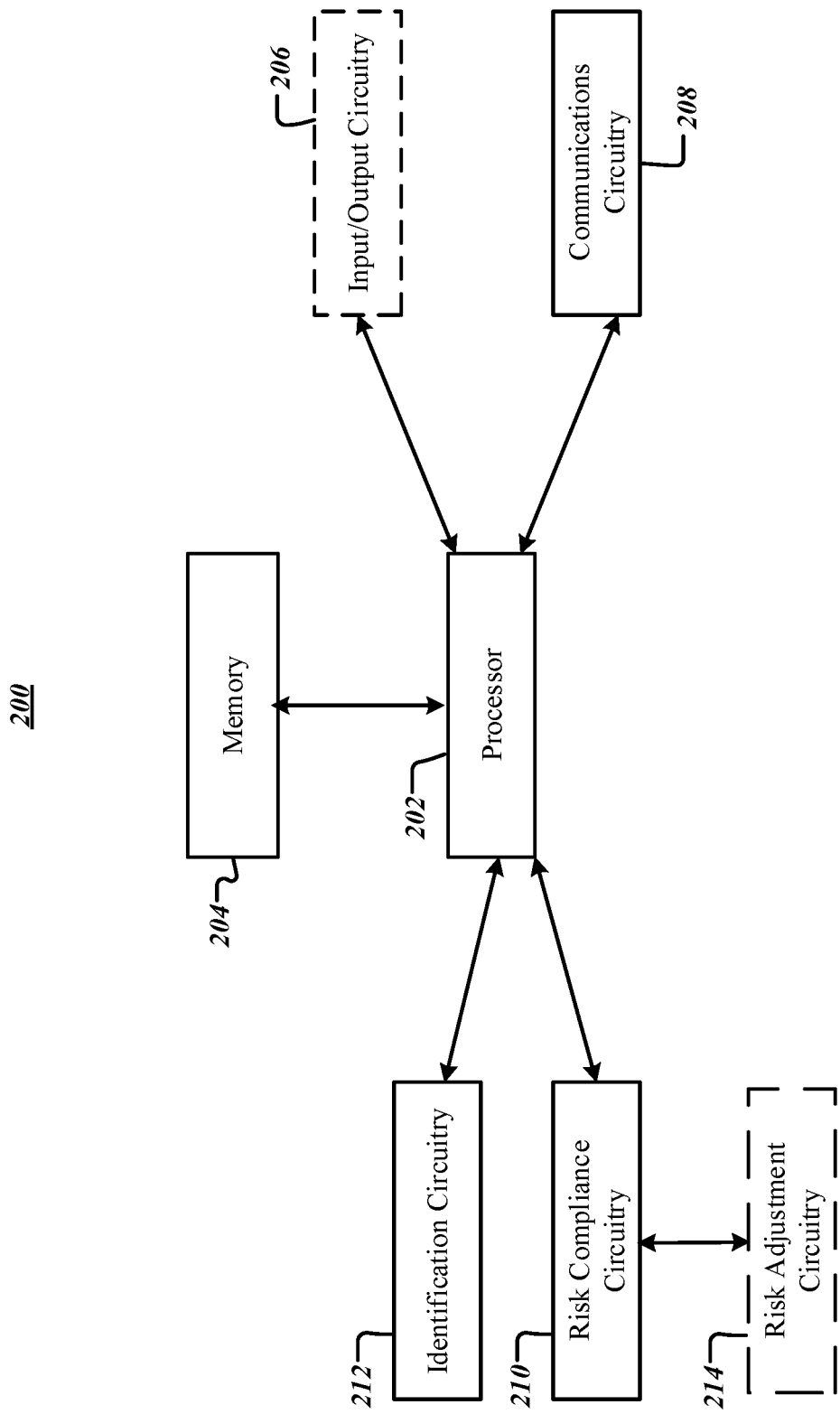
FIG. 2 illustrates a schematic block diagram of example circuitry that may perform various operations, in accordance with some example embodiments described herein.

As illustrated in FIG. 2, the risk management server 200 may include a processor 202, a memory 204, input/output circuitry 206, and communications circuitry 208. Moreover, the risk management server 200 may include risk compliance circuitry 210, identification circuitry 212, and, in some embodiments, risk adjustment circuitry 214. The risk management server 200 may be configured to execute the operations described below in connection with FIGS. 3-6. Although components 202-214 are described in some cases using functional language, it should be understood that the particular implementations necessarily include the use of particular hardware. It should also be understood that certain of these components 202-214 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the risk management server 200 may be housed within one or more of the user device 106, the first vendor 108, and/or the second vendor 110. It will be understood in this regard that some of the components described in connection with the risk management server 200 may be housed within one of these devices, while other components are housed within another of these devices, or by yet another device not expressly illustrated in FIG. 1. In some embodiments, the risk management server 200 may operate as a central repository and authenticator that is accessible by various user devices and vendor devices (e.g., computing systems associated with online vendors and service providers).

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the risk management server 200 may provide or supplement the functionality of particular circuitry.

In some embodiments, the processor 202 (and/or coprocessor or any other processing circuitry assisting or otherwise associated with the processor) may be in communication with the memory 204 via a bus for passing information among components of the risk maintenance server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the risk management server 200 to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the risk maintenance server, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The risk management server 200 further includes input/output circuitry 206 that may, in turn, be in communication with processor 202 to provide output to a user and to receive input from a user, user device, or another source (e.g., so as receive and/or transmit risk parameter and/or threshold data). In this regard, the input/output circuitry 206 may comprise a display that may be manipulated by a mobile application. In some embodiments, the input/output circuitry 206 may also include additional functionality keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the risk management server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the risk management server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Identification circuitry 212 includes hardware components designed to identify a vendor associated with a session establishment process and obtain one or more risk parameters associated with the session establishment process, wherein the one or more risk parameters are associated with a vendor performing the first session establishment process. The identification circuitry 212 may utilize processing circuitry, such as the processor 202, to perform its corresponding operations, and may utilize memory 204 to store collected information.

Risk compliance circuitry 210 includes hardware components designed to determine if one or more risk parameters satisfy one or more risk thresholds. The risk compliance circuitry 212 may utilize processing circuitry, such as the processor 202, to perform its corresponding operations, and may utilize memory 204 to store collected information. By way of example, in some instances, one or more risk parameters associated with a first session establishment process performed by a first vendor (e.g., confidence factor, risk factor, risk parameters, or other metric described hereafter) may be compared with one or more corresponding first risk thresholds to determine if the first session process performed by the first vendor satisfies the thresholds of the risk management server (e.g. confidence factor, risk factor, or the like). In the way, the risk compliance circuitry 210 may determine if a modification or adjustment in subsequent risk thresholds for other session establishment processes performed by other vendors is necessary.

In some embodiments, the risk compliance circuitry 210 may further include or be in communication with risk adjustment circuitry 214. For example, in an instance in which one or more first risk parameters fail to satisfy one or more first risk thresholds (e.g. determined by the risk compliance circuitry 210), the risk adjustment circuitry 214 may be configured to adjust one or more second risk parameters associated with a second session establishment process (e.g. performed by a second vendor 110) in response to the determination of the risk compliance circuitry 210.

It should also be appreciated that, in some embodiments, the risk compliance circuitry 210, identification circuitry 212, or risk adjustment circuitry 214, may include a separate processor, specially configured field programmable gate array (FPGA), or application specific interface circuit (ASIC) to perform its corresponding functions.

In addition, computer program instructions and/or other type of code may be loaded onto a computer, processor or other programmable risk maintenance server's circuitry to produce a machine, such that the computer, processor other programmable circuitry that execute the code on the machine create the means for implementing the various functions, including those described in connection with the components of risk management server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Improved Risk Management

Figure 3:
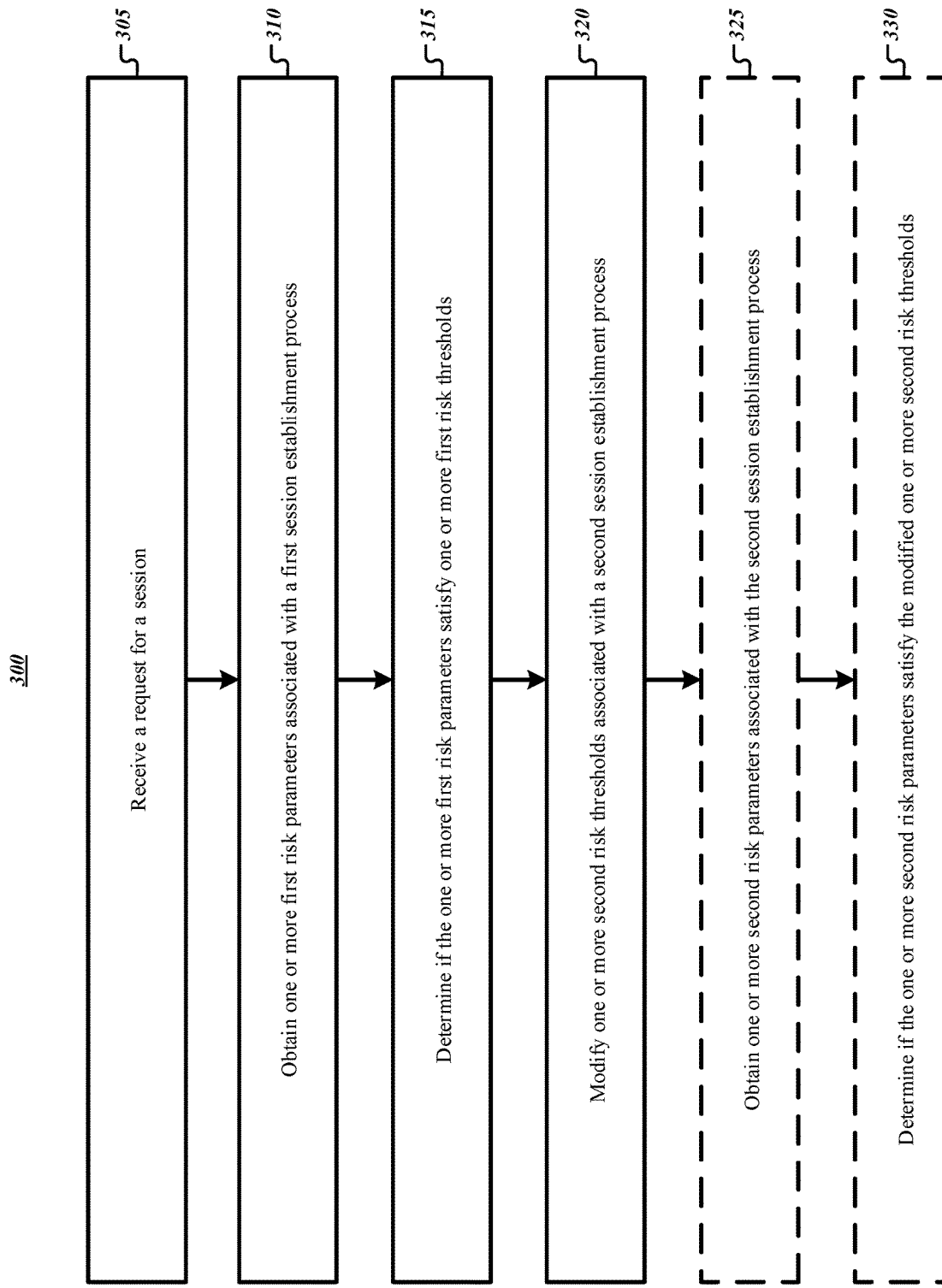
FIG. 3 illustrates an example flowchart for improved risk compliance management, in accordance with some example embodiments described herein.

FIG. 3 illustrates a flowchart containing a series of operations for improved risk compliance management. The operations illustrated in FIG. 3 may, for example, be performed by, with the assistance of, and/or under the control of an apparatus (e.g., risk management server 200), as described above. In this regard, performance of the operations may invoke one or more of processor 202, memory 204, input/output circuitry 206, communications circuitry 208, identification circuitry 212, risk compliance circuitry 210, and/or risk adjustment circuitry 214.

As shown in operation 305, the apparatus (e.g., risk management server 200) includes means, such as input/output circuitry 206, communications circuitry 208, or the like, for receiving a request for a session. As described above, the session request may refer to a request to establish an authenticated online session where the session is established upon completion of at least a first session establishment process and a second establishment process. In some example embodiments, the communications circuitry 208 may receive a request for a session or an instruction to establish a session from a user device 106 and/or vendor 108, 110. By way of example, the user device 106 may request an authorized session with the risk management server 200 (e.g., an authorized session with a financial institution or the like). Similarly, in some embodiments, the user device 106 may receive a request for a session from a vendor 108, 110 and may request that a session be established by the risk management server 200. In some other embodiments, the input/output circuitry 206 of the risk management server 200 may receive a request (e.g., via a direct user input or automatically) for session without input from the user device 106 or vendor 108, 110. For instance, the input/output circuitry 206 may receive the request for a session from direct user interaction with the risk management server 200, or the identification circuitry 212 may trigger the request for the session in an instance in which the risk management server 200 requires a session to complete an internal process. By way of example, a request to establish an authenticated online session (e.g. session) may occur when a user attempts (e.g., via a user device 106) to access one or more applications (e.g., online banking app or the like) supported by the risk management server. By way of an additional example, a request for a session may also occur in instances in which a user attempts to access an application or entity (e.g., web application, server, or the like) hosted or provided by a vendor device (e.g., or any $3^{rd}$ party). For example, a user attempting to complete a transaction at an online marketplace may request an authenticated session. As described herein, in instances in which one or more biometric features are used to authenticate a user, the authenticated online session may refer to an authenticated biometric session or a facial biometric session.

Thereafter, as shown in operation 310, the apparatus (e.g., risk management server 200) includes means, such as identification circuitry 212 or the like, for obtaining one or more first risk parameters associated with a first session establishment process. According to an example embodiment, a first vendor 108 (e.g., online vendor, application provider, or the like) may be used by the risk management server 200 in order to complete a first session establishment process. By way of example, the first session establishment process may define a biometric authentication procedure in which one or more biometric attributes are received from a user (e.g., associated with the request for the session) and compared against previously-acquired biometric attributes (e.g., known valid targets). The risk management server 200 may, in some embodiments, use the first vendor 108 to perform this biometric authentication process separate from the risk management server 200, and, in other embodiments, may use the first vendor 108 to provide an application supported by the risk management server for completing the biometric authentication procedure.

In either event, the identification circuitry 212 or the like of the risk management server 200 may obtain one or more first risk parameters associated with the first session establishment process. In some embodiments, the one or more first risk parameters may refer to the first vendor's 108 confidence metric in completing the first session establishment process. By way of continued example, the one or more first risk parameters may refer to a confidence factor regarding the first vendor's performance of the biometric authentication procedure. Said differently, the one or more first risk parameters may refer to a confidence factor representative of the first vendor's 108 confidence that biometric attributes received from the user correspond to the previously-acquired biometric attributes (e.g., known valid targets). In particular, the one or more first risk parameters may define a 90% confidence factor that the biometric attributes are accurate.

By way of continued example, another example first risk parameter associated with the first session establishment process performed by the first vendor 108 may define a number of acquired biometric attributes. By way of example, in performing the biometric authentication procedure (e.g., first session establishment process), the first vendor may require three (3) biometric attributes from a user (e.g., eye scan, fingerprint scan, voice sample, etc.). In some embodiments, the number and type of biometric attributes acquired may correspond to the one or more first risk parameters.

In some embodiments, the one or more first risk parameters may instead be associated with a metric of the first vendor 108 and not directly related to the performance of the first session establishment process. By way of example, in some instances, the one or more first risk parameters of the first vendor may define the number of times in which the first vendor 108 has been subjected to an attack, unauthorized access, or otherwise suspicious activity. In this regard, the first vendor 108 may record each instance in which their systems (e.g. first vendor device(s)) were compromised such that these records may be used as the one or more first risk parameters. Similarly, in other embodiments, a time between attacks, unauthorized access, or suspicious activity may be used as the one or more first risk parameters. By way of example, the first vendor 108 may record each instance in which their systems were compromised, a duration for each attack, and a time value between attacks. In this way, the one or more first risk parameters may relate to the frequency in which the first vendor 108 is subjected to compromising events.

While described herein with reference to the first session establishment process as a biometric authentication procedure, the present disclosure contemplates that the first session establishment process may correspond to any process, procedure, step, or the like used to establish a session. Similarly, the present disclosure contemplates that the one or more first risk parameters may refer to any metric or otherwise measurable parameter that is related to the risk associated with the first vendor 108 and/or the first session establishment process.

Thereafter, as shown in operation 315, the apparatus (e.g., risk management server 200) includes means, such as processor 202, memory 204, risk compliance circuitry 210, or the like, for determining if the one or more first risk parameters satisfy one or more first risk thresholds. In some example embodiments, and as described in greater detail below in connection with FIG. 6, operation 315 may use first risk parameter thresholds that are retrieved from a remotely-stored risk compliance database 112. In other embodiments where the risk threshold data is not stored remotely, this operation may request these one or more risk thresholds from a memory (e.g., memory 204) locally storing this data. As described hereafter, determining if the one the one or more first risk parameters satisfy one or more first risk thresholds may include comparing the one or more first risk parameters with the one or more first risk thresholds. In an instance in which the one or more first risk parameters exceed the one or more first risk thresholds (e.g., dependent upon the nature of the first risk threshold), the risk management server 200 may determine that the one or more first risk parameters satisfy the one or more first risk thresholds. In an instance in which the one or more first risk parameters fail to exceed the one or more first risk thresholds (e.g., dependent upon the nature of the first risk threshold), the risk management server 200 may determine that the one or more first risk parameters fail satisfy the one or more first risk thresholds.

Figure 4:
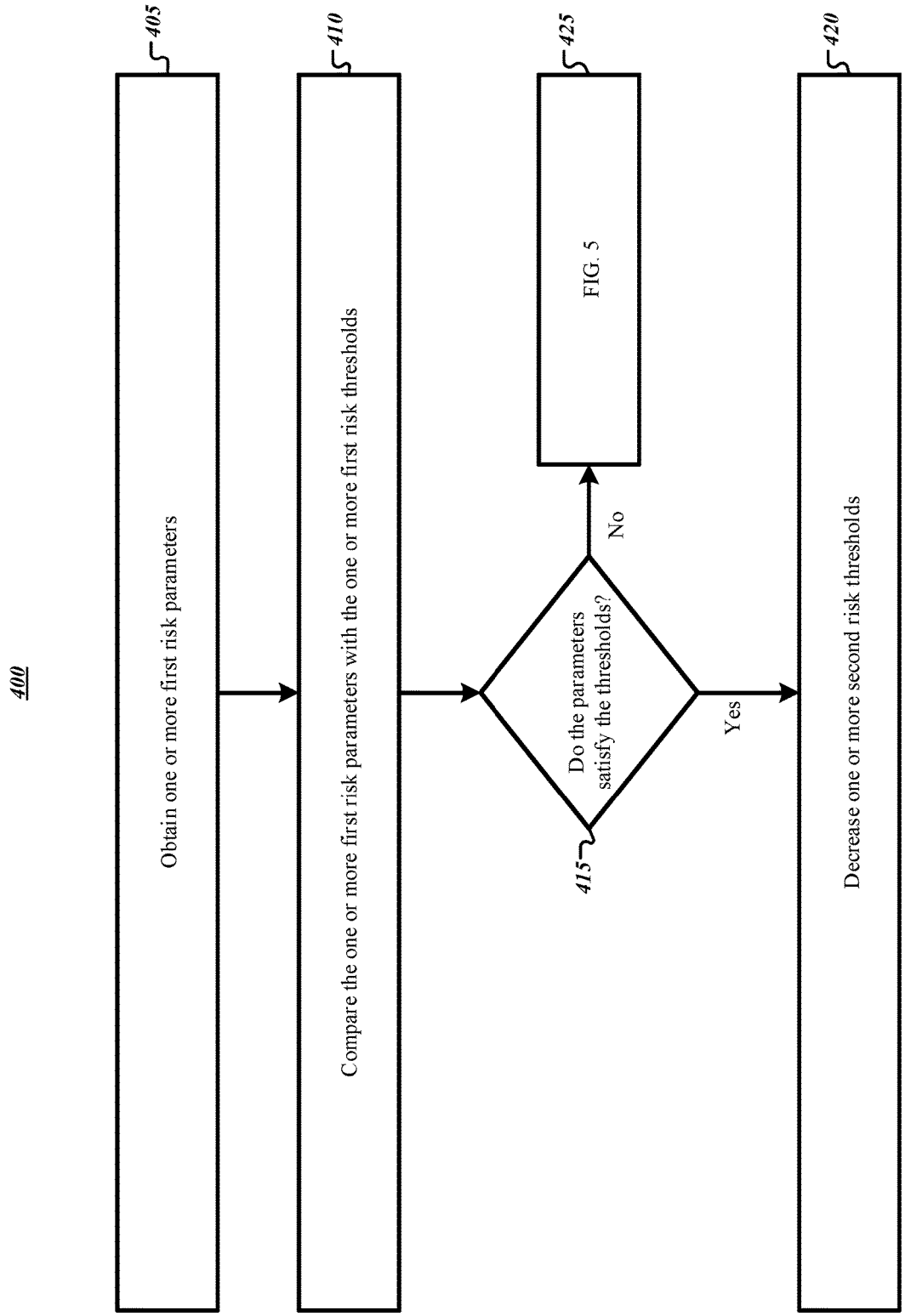
FIG. 4 illustrates an example flowchart for modifying second risk thresholds in response to first risk parameter compliance, in accordance with some example embodiments described herein.
Figure 5:
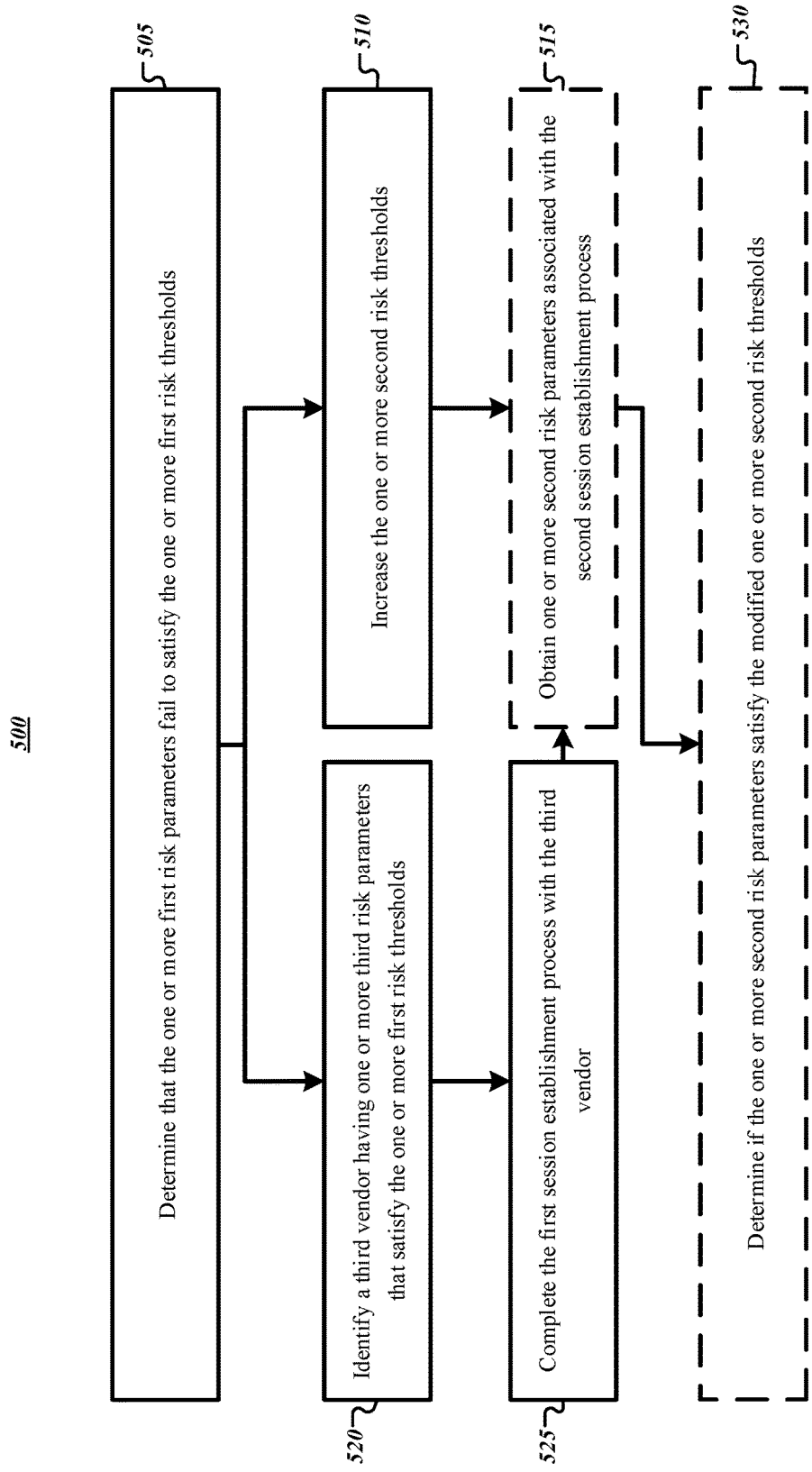
FIG. 5 illustrates an example flowchart for modifying second risk thresholds and bypassing first vendors in response to first risk parameter noncompliance, in accordance with some example embodiments described herein.

As described hereafter with reference to FIGS. 4-5, the risk compliance circuitry 210 may determine if the one or more first risk parameters (e.g., those described above at operation 310) satisfy one or more first risk thresholds by comparing the first risk parameters with the first risk thresholds By way of continued example, the one or more first risk parameters may correspond to a confidence factor of 90% in a biometric authentication procedure, and the first risk thresholds may correspond to a required 85% confidence factor (e.g., a first risk threshold associated with the first session establishment process). In such an embodiment, the first risk parameters satisfy the first risk threshold. By way of an additional example, in instances in which the first risk parameters correspond to the number of unauthorized accesses to the devices of the first vendor 108 (e.g. first risk thresholds associated with the first vendor), the first risk threshold may define a maximum threshold value of five (5)

instances of unauthorized access. As such, when the first vendor 108 has experienced eight (8) instances of unauthorized access (e.g., a first risk parameter of eight (8)), the first risk parameter fails to satisfy the first risk threshold.

Thereafter, as shown in operation 320, the apparatus (e.g., risk management server 200) includes means, such as processor 202, memory 204, risk adjustment circuitry 214, or the like, for modifying one or more second risk thresholds associated with a second session establishment process to be performed by a second vendor 110. In response to determining if the first risk parameters satisfy the first risk thresholds, the risk management server 200 of the present invention is configured to modify (e.g., adjust, update, etc.) risk thresholds (e.g., second risk thresholds) associated with other vendors (e.g. second vendor 110) performing other session establishment processes. In this way, the apparatus of the present disclosure may dynamically adapt to ever-changing risks associated with each process in a session establishment procedure. In some embodiments, when the first risk parameters satisfy the first risk threshold at operation 315, one or more second risk threshold may be modified as described with reference to FIG. 4. In some embodiments, when the first risk parameters fail to satisfy the first risk threshold at operation 315, one or more second risk threshold may be modified as described with reference to FIG. 5.

In some embodiments, as shown in operation 325, the apparatus (e.g., risk management server 200) includes means, such as processor 202, memory 204, identification circuitry 212, or the like, for obtaining one or more second risk parameters associated with the second session establishment process. Similar to operation 310 above, according to an example embodiment, a second vendor 110 (e.g., online vendor, application provider, or the like) may be used by the risk management server 200 in order to complete a second session establishment process. By way of example, the second session establishment process may define a liveness detection procedure in which images (e.g., or a video steam) of a user (e.g., associated with the request for the session) is analysed in order to confirm that the user associated with the images (e.g., or the video steam) is present. Said differently, liveness detection operates to prevent fraudulent activity, spoofing, or the like in which a user is mimicked by a prior photo or video of the user. The risk management server 200 may, in some embodiments, use the second vendor 110 to perform this liveness detection process separate from the risk management server 200, and, in other embodiments, may use the second vendor 108 to provide an application supported by the risk management server 200 for completing the liveness detection procedure (e.g., second session establishment process).

In either event, the identification circuitry 212 or the like of the risk management server 200 may obtain one or more second risk parameters associated with the second session establishment process. In some embodiments, the one or more second risk parameters may refer to the second vendor's 110 confidence metric in completing the second session establishment process. By way of continued example, the one or more second risk parameters may refer to a confidence factor regarding the first vendor's performance of the liveness detection procedure. Said differently, the one or more second risk parameters may refer to a confidence factor representative of the second vendor's 110 confidence that the received image or video corresponds to a present user. In particular, the one or more second risk parameters may define a 90% confidence factor that the user is present.

By way of continued example, another example second risk parameter associated with the second session establishment process performed by the second vendor 110 may define a number of commands provided to a user (e.g., move head, close eyes, etc.) By way of example, in performing the liveness detection procedure (e.g., second session establishment process), the second vendor may require that a user be prompted to move three (3) times. In some embodiments, the number and type of commands may correspond to the one or more second risk parameters.

While described herein with reference to the second session establishment process as a liveness detection procedure, the present disclosure contemplates that the second session establishment process may correspond to any process, procedure, step, or the like used to establish a session. Similarly, the present disclosure contemplates that the one or more second risk parameters may refer to any metric or otherwise measurable parameter that is related to the risk associated with the second vendor 110 and/or the second session establishment process.

In some embodiments, as shown in operation 330, the apparatus (e.g., risk management server 200) includes means, such as processor 202, memory 204, risk compliance circuitry 210, or the like, for determining if the one or more second risk parameters satisfy the modified one or more second risk thresholds. As described above with reference to operation 315, the risk compliance circuitry 210 may determine if the one or more second risk parameters (e.g., those described above at operation 325) satisfy one or more modified second risk thresholds (e.g., modification described more fully with reference to FIGS. 4-5) by comparing the second risk parameters with the second risk thresholds By way of continued example, if the one or more second risk parameters correspond to a confidence factor of 90% in a liveness detection procedure (e.g., second risk thresholds and associated second session establishment process), and the modified second risk parameters correspond to a require 65% confidence factor, the second risk parameters satisfy the second risk threshold. By way of an additional example, in instances in which the second risk parameters correspond to the number of movement commands issued to the user, the second risk threshold may define a minimum threshold value of three (3) commands. As such, when the second vendor 110 only issues two (2) commands (e.g., a second risk parameter of two (2)), the second risk factor fails to satisfy the second risk threshold. In some instances, upon satisfying the second risk threshold(s), the risk management server 200 may establish a session for the user device 106.

Turning next to FIG. 4, a flowchart is shown that modifies the second risk thresholds in response to first risk parameter compliance. The operations illustrated in FIG. 4 may, for example, be performed by, with the assistance of, and/or under the control of an apparatus (e.g., risk management server 200), as described above. In this regard, performance of the operations may invoke one or more of processor 202, memory 204, input/output circuitry 206, communications circuitry 208, identification circuitry 212, risk compliance circuitry 210, and/or risk adjustment circuitry 214.

Operations 405 and 410 may operate substantially equivalent to corresponding operations 305 and 310 in FIG. 3 in that the risk management server 200 may include means, such as the input/output circuitry 206, communications circuitry 208, identification circuitry 210, risk compliance circuitry, or the like for obtaining one or more first risk parameters and comparing the one or more first risk parameters with the one or more first risk thresholds. Thereafter, as shown in operations 415, the risk compliance circuitry 210 may determine that the one or more first risk parameters satisfy the one or more first risk thresholds. As would be evident to one of ordinary skill in the art in light of the present disclosure, in instances in which the first vendor 108 and/or the first session establishment process meet or exceed the first risk thresholds, the risk management server 200 may determine that additional session establishment processes require the same unmodified or decreased risk thresholds.

By way of example, in some instances the first session establishment process may be the most important process for establishing a session (e.g., largest threat to unauthorized access or the like) such that when the first risk parameters satisfy the first risk thresholds, the risk management server 200 may be confident that the session should be established with the user (e.g., subsequent operations are less important). In other example embodiments, the first risk thresholds may be large enough (e.g., require a confidence value that is large enough) that the risk management server 200 deems the subsequent session establishment processes redundant (e.g., satisfying the confidence parameter for the first process would necessitate compliance with subsequent processes). Furthermore, embodiments of the present disclosure may also provide for scaled modification based upon a difference between the risk parameter and risk threshold. By way of example, in an instance in which the first risk parameters fail to satisfy the first risk thresholds by a large margin (e.g., a large difference between the parameters and thresholds), a third vendor may be selected to complete the first session establishment process as described below. By way of continued example, in an instance in which the first risk parameters fail to satisfy the first risk thresholds by a small margin (e.g., a small difference between the parameters and thresholds), one or more second risk thresholds may be modified as described hereafter.

Turning to operation 420, the apparatus (e.g., risk management server 200) includes means, such as processor 202, memory 204, communications circuitry 208, risk adjustment circuitry 214, or the like for decreasing one or more second risk thresholds. By way of example, when the first session establishment operation performed by the first vendor 108 is directed to a biometric authentication procedure, the confidence factor (e.g., one or more first risk parameters) may greatly exceed the first risk threshold such that the risk adjustment circuitry 214 may decrease the one or more second risk thresholds. By way of continued example, in some instances the biometric authentication procedure (e.g., first session establishment procedure) may identify one or more biometric parameters, features, etc. (scarring, unique tattoos, etc.) such that existence of these biometric features increases the confidence factor (e.g., first risk parameter) well beyond the requirement of the first risk threshold. Said differently, in such an embodiment, the risk management sever 200 may be certain (e.g., having a high confidence factor) of the identity of the user requesting the session. As such, the risk adjustment circuitry 214 at operation 420 may reduce the second risk thresholds associated with the liveness detection procedure (e.g., second session establishment process). While described herein with reference to decreasing the second risk threshold, the present disclosure contemplates that decreasing this threshold may refer to any change in the one or more second risk thresholds such that the one or more second risk parameters are more likely to satisfy the second risk thresholds.

With reference to operation 425, in instances in which the first risk parameters fail to satisfy the risk thresholds, the apparatus (e.g., risk management server 200) may perform one or more of the operations described with reference to FIG. 5.

Turning next to FIG. 5, a flowchart is shown that describes example embodiments for modifying second risk thresholds and bypassing first vendors in response to first risk parameter noncompliance. The operations illustrated in FIG. 5 may, for example, be performed by, with the assistance of, and/or under the control of an apparatus (e.g., risk management server 200), as described above. In this regard, performance of the operations may invoke one or more of processor 202, memory 204, input/output circuitry 206, communications circuitry 208, identification circuitry 212, risk compliance circuitry 210, and/or risk adjustment circuitry 214.

As described with reference to FIGS. 3-4, in some instances, the risk management server 200, via the risk compliance circuitry 210, may determine that the one or more first risk parameters fail to satisfy the one or more first risk thresholds. In some embodiments (at operations 520, 525), the apparatus (e.g., risk management server 200) includes means, such as processor 202, memory 204, communications circuitry 208, risk adjustment circuitry 214, or the like for identifying a third vendor 114 having one or more third risk parameters that satisfy the one or more first risk thresholds at operation 520 and completing the first session establishment process with the third vendor 114. By way of continued example, if in performing the biometric authentication procedure (e.g., first session establishment process) the first vendor experiences an error or otherwise is unable to perform the biometric authentication procedure, the risk identification circuitry 112 may identify a third vendor 114 for completing the biometric authentication.

By way of an additional example, if the first risk parameters of the first vendor (e.g., before, during, or after attempting to perform the biometric authenticate procedure) correspond to instances of excessive unauthorized access (e.g. a security breach or the like), the risk management server 200 may determine that the first vendor is not capable of securely performing the first session establishment process. With reference to operation 525, the identification circuitry may instead identify a third vendor 114 for completing this process. In some embodiments, one or more third risk parameters of the third vendor 114 may satisfy the one or more first risk thresholds associated with the first session establishment process. Said differently, analysis of the risks associated with the third vendor 114 may occur prior to instances in which the first vendor 108 is compromised such that the third vendor 114 may be quickly used by the risk management server 200 as a bypass for the first vendor 108.

Turning to operation 510, the apparatus (e.g., risk management server 200) includes means, such as processor 202, memory 204, communications circuitry 208, risk adjustment circuitry 214, or the like for increasing one or more second risk thresholds. By way of example, when the first session establishment operation performed by the first vendor 108 is directed to a biometric authentication procedure, the confidence factor (e.g., one or more first risk parameters) may fail to satisfy the first risk threshold by a large margin such that the risk adjustment circuitry 214 may increase the one or more second risk thresholds. By way of continued example, the one or more first risk parameters may refer to a confidence factor representative of the first vendor's 108 confidence that biometric attributes received from the user correspond to the previously-acquired biometric attributes (e.g., known valid targets). In particular, the one or more first risk parameters may define a 30% confidence factor that the biometric attributes are accurate. Said differently, in such an embodiment, the risk management sever 200 may be relatively uncertain (e.g., having a low confidence factor) of the identity of the user requesting the session. As such, the risk adjustment circuitry 214 at operation 510 may increase the second risk thresholds associated with the liveness detection procedure (e.g., second session establishment process).

In this way, the risk management server 200 may operate to maintain the security of the session establishment process as a whole even in instances in which a vendor and corresponding session establishment process fail to satisfy associated risk thresholds. For example, when acquiring biometric data by the first vendor, the acquisition of the biometric data may be affected by external factors (e.g., excessive weather, poor visibility, etc.) such that the one or more first risk parameters fail to satisfy the associated first risk thresholds (e.g., while the identity of the user is valid). To accommodate, the risk adjustment circuitry 114 may operate to increase the associated risk thresholds for subsequent session establishment operations to ensure a secure session. While described herein with reference to increasing the second risk threshold, the present disclosure contemplates that increasing this threshold may refer to any change in the one or more second risk thresholds such that the one or more second risk parameters are less likely to satisfy the second risk thresholds. As would be evident to one of ordinary skill in the art in light of the present disclosure, in some embodiments, each of the one or more first and second risk thresholds may also be weighted prior to any adjustment by the risk adjustment circuitry 114 so as to provide an initial difference between thresholds within the same session establishment process. By way of example, certain biometric attributes may be more susceptible to impersonation such that these attributes may be weighted less than other biometric attributes that are more difficult to impersonate.

Operations 515 and 530 may operate substantially equivalent to corresponding operations 325 and 330 in FIG. 3 in that in operations 515 and 520 the apparatus (e.g., risk management server 200) includes means, such as processor 202, memory 204, communications circuitry 208, identification circuitry 212, risk compliance circuitry 210, or the like for obtaining one or more second risk parameters associated with the second session establishment process and determining if the one or more second risk parameters satisfy the modified one or more second risk thresholds.

Figure 6:
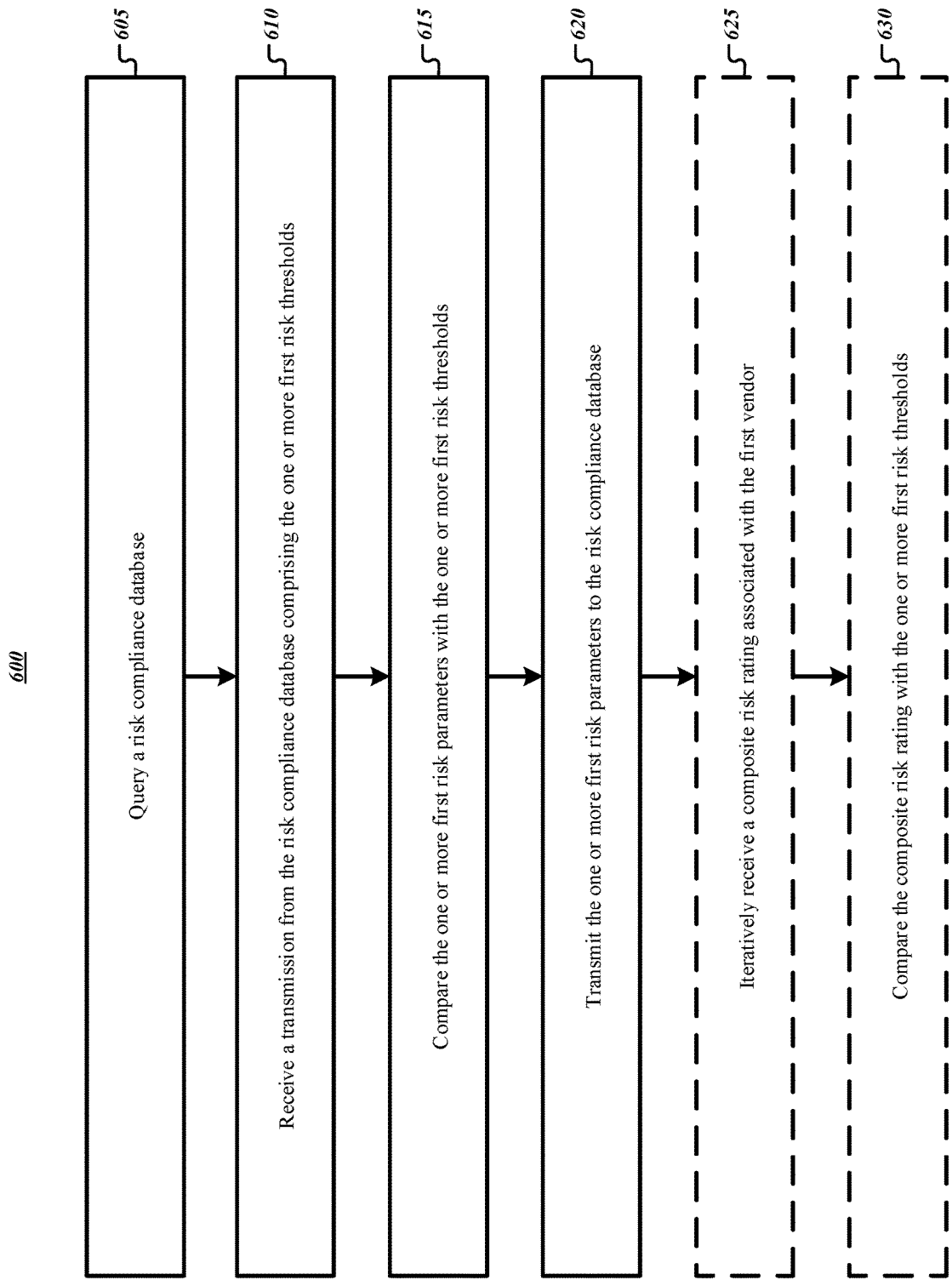
FIG. 6 illustrates an example flowchart for storing risk parameter compliance and receiving composite risk ratings, in accordance with some example embodiments, described herein.

Turning next to FIG. 6, a flowchart for storing risk parameter compliance and receiving composite risk ratings is illustrated. The operations illustrated in FIG. 6 may, for example, be performed by, with the assistance of, and/or under the control of an apparatus (e.g., risk management server 200), as described above. In this regard, performance of the operations may invoke one or more of processor 202, memory 204, input/output circuitry 206, communications circuitry 208, identification circuitry 212, risk compliance circuitry 210, and/or risk adjustment circuitry 214. As described above, in some embodiments, the risk management server 200 may be in communication with a risk compliance database 112 and may interact (e.g., transmit and receive date therebetween) with the risk compliance database 112 in determining if one or more risk parameters satisfy one or more corresponding risk thresholds.

As shown in operations 605 and 610, the apparatus (e.g., risk management server 200) includes means, such as processor 202, memory 204, communications circuitry 208, identification circuitry 212, or the like, for querying a risk compliance database 112 and receiving a transmission from the risk compliance database 112 comprising the one or more first risk thresholds. As would be evident to one of ordinary skill in the art in light of the present disclosure, the risk management server 200 may frequently (e.g. continuously) receive requests for a session such that risk parameters may be iteratively received by the risk management server from vendors, and risk thresholds may be iteratively received by the risk maintenance sever 200 from the risk compliance database 112.

Turning to operation 615, the apparatus (e.g., risk management server 200) includes means, such as processor 202, memory 204, communications circuitry 208, risk compliance circuitry 210, or the like, for comparing the one or more first risk parameters with the one or more first risk thresholds as described above with reference to FIG. 3. In the embodiment illustrated in FIG. 6, however, the risk maintenance server 200 may, upon completion of the comparison at operation 615, transmit the one or more first risk parameters and/or associated first risk thresholds to the risk compliance database 112 for storage at operation 620. These iteratively-received risk parameters and thresholds may be analyzed at the risk compliance database 112 (e.g., analyzed by the risk management server 200, the processor 202, or the like and stored in the risk compliance database) so as to form a composite risk rating associated with each vendor (e.g., describe with reference to the first vendor 108 in FIG. 6)

Turning to operation 625, the apparatus (e.g., risk management server 200) includes means, such as processor 202, memory 204, communications circuitry 208, risk compliance circuitry 210, or the like, for iteratively receiving a composite risk rating associated with the first vendor and, at operation 630, comparing the composite risk rating with the one or more first risk thresholds. By way of example, over time (e.g., due to receiving risk parameters in performing each session establishment process), a collection of first risk parameters may be stored by the risk compliance database 112 associated with a first vendor 108 and an associated first session establishment process.

In order to avoid adverse effects associated with outlier session requests, the risk maintenance server 200 may (via the risk compliance database 112) generate a composite risk rating that is a statistical representative of the first risk parameters. By way of a particular example, the risk maintenance server 200 may iteratively transmit confidence factors (e.g., first risk parameters) associated with the biometric authentication procedure of the first vendor. A historical average (e.g., including any number of statistical manipulations, recency biasing, or the like) may be generated and stored for the first vendor 108. In this way, the composite risk rating (e.g., historical average or the like) may operate to reduce (e.g., or otherwise hedge against) outlier instances in which an otherwise compliant vendor fails to satisfy one or more risk thresholds. While described herein with reference to a composite risk rating associated with first vendor 108, the present disclosure contemplates that a composite risk rating may be generated for each vendor and compared with associated risk thresholds for the session establishment processes performed by said vendor.

As described above, various technical challenges are surmounted via technical solutions contemplated herein. For instance, the use of a risk management server with adjustable risk threshold amongst vendors and processes provides for improved risk compliance. Embodiments of the present disclosure provide improved risk monitoring and compliance by obtaining first risk parameters associated with a first session establishment process and associated first vendor performing said process. These first risk parameters are compared with one or more first risk thresholds and, based upon the outcome, are used to modify second risk thresholds associated with a second session establishment process and/or second vendor performing said process. In doing so, such example implementations confront and solve at least two technical challenges: (1) they reliably monitor and store risk compliance amongst various vendors performing distinct session establishment processes, and (2) they dynamically adapt to ever-changing threats to each step in session establishment.

FIGS. 3-6 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the risk management server 200 and executed by a processor 202 of the risk management server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for performing dynamic risk compliance management in establishment of an online session, the method comprising:
   receiving, by a computing device, a request to establish an authenticated online session, where the authenticated online session is established upon completion of at least a first session establishment process and a second session establishment process;
   obtaining, by identification circuitry of the computing device, one or more first confidence factors for the first session establishment process, wherein the one or more first confidence factors are representative of a first vendor performing the first session establishment process;
   determining, by risk compliance circuitry of the computing device, if the one or more first confidence factors satisfy one or more first risk thresholds;
   in an instance where the one or more first confidence factors satisfy the one or more first risk thresholds, modifying, by risk adjustment circuitry of the computing, one or more second risk thresholds representative of the second session establishment process performed by a second vendor;
   obtaining, by the identification circuitry of the computing device, one or more second confidence factors for the second session establishment process, wherein the one or more second confidence factors are representative of the second vendor performing the second session establishment process;
   determining, by the risk compliance circuitry of the computing device, if the one or more second confidence factors satisfy the modified one or more second risk thresholds; and
   in an instance in which the one or more second confidence factors satisfy the modified one or more second risk thresholds, establishing, by the computing device, the authenticated online session.

2. The method according to claim 1, wherein the one or more first risk thresholds are associated with the first session establishment process.

3. The method according to claim 1, wherein the one or more first risk thresholds are associated with the first vendor.

4. The method according to claim 1, wherein modifying the one or more second risk thresholds, in an instance in which the one or more first confidence factors fail to satisfy the one or more first risk thresholds, further comprises increasing the one or more second risk thresholds.

5. The method according to claim 1, wherein modifying the one or more second risk thresholds, in an instance in which the one or more first confidence factors satisfy the one or more first risk thresholds, further comprises decreasing the one or more second risk thresholds.

6. The method according to claim 1, further comprising, in an instance in which the one or more first confidence factors fail to satisfy the one or more first risk thresholds, completing the first session establishment process with a third vendor, wherein one or more third confidence factors associated with the third vendor satisfy the one or more first risk thresholds.

7. The method according to claim 1, wherein determining if the one or more first confidence factors satisfy the one or more first risk thresholds associated with the first vendor comprises:
- querying, by the identification circuitry of the computing device, a risk compliance database;
- in response to querying the risk compliance database, receiving a transmission from the risk compliance database comprising the one or more first risk thresholds;
- comparing, by the risk compliance circuitry of the computing device, the one or more first confidence factors with the one or more first risk thresholds; and
- transmitting the one or more first confidence factors to the risk compliance database.

8. The method according to claim 7, further comprising:
- iteratively transmitting the one or more first confidence factors to the risk compliance database; and
- iteratively receiving a composite risk rating associated with the first vendor.

9. The method according to claim 8, further comprising:
- comparing, by the risk compliance circuitry of the computing device, the composite risk rating associated with the first vendor with the one or more first risk thresholds.

10. An apparatus for performing dynamic risk compliance management in establishment of an online session, the apparatus comprising:
- communications circuitry configured to receive a request to establish an authenticated online session, where the authenticated online session is established upon completion of at least a first session establishment process and a second establishment process;
- identification circuitry configured to obtain one or more first confidence factors for the first session establishment process, wherein the one or more first confidence factors are representative of a first vendor performing the first session establishment process;
- risk compliance circuitry configured to determine if the one or more first confidence factors satisfy one or more first risk thresholds;
- risk adjustment circuitry configured to, in an instance where the one or more first confidence factors satisfy the one or more first risk thresholds, modify one or more second risk thresholds representative of a second session establishment process performed by a second vendor,
- wherein the identification circuitry is further configured to obtain one or more second confidence factors for the second session establishment process, wherein the one or more second confidence factors are representative of the second vendor performing the second session establishment process,
- wherein the risk compliance circuitry is further configured to determine if the one or more second confidence factors satisfy the modified one or more second risk thresholds, and
- wherein the communications hardware is further configured to in an instance in which the one or more second confidence factors satisfy the modified one or more second risk thresholds, establish the authenticated online session.

11. The apparatus according to claim 10, wherein the one or more first risk thresholds are associated with the first session establishment process.

12. The apparatus according to claim 10, wherein the one or more first risk thresholds are associated with the first vendor.

13. The apparatus according to claim 10, wherein the risk adjustment circuitry is further configured to, in an instance in which the one or more first confidence factors fail to satisfy the one or more first risk thresholds, increase the one or more second risk thresholds.

14. The apparatus according to claim 10, wherein the risk adjustment circuitry is further configured to, in an instance in which the one or more first confidence factors satisfy the one or more first risk thresholds, decrease the one or more second risk thresholds.

15. The apparatus according to claim 4, wherein the identification circuitry is further configured to, in an instance in which the one or more first confidence factors fail to satisfy the one or more first risk thresholds, complete the first session establishment process with a third vendor, wherein one or more third confidence factors associated with the third vendor satisfy the one or more first risk thresholds.

16. The apparatus according to claim 10, wherein the risk compliance circuitry is further configured to, in an instance in which the one or more second confidence factors satisfy the modified one or more second risk thresholds, establish the authenticated online session.

17. The apparatus according to claim 10, wherein the risk compliance circuitry is further configured to:
- query a risk compliance database;
- in response to querying the risk compliance database, receive a transmission from the risk compliance database of the one or more first risk thresholds;
- compare the one or more first confidence factors with the one or more first risk thresholds; and
- transmit the one or more first confidence factors to the risk compliance database.

18. The apparatus according to claim 17, wherein the risk compliance circuitry is further configured to:
- iteratively transmit the one or more first confidence factors to the risk compliance database; iteratively receive a composite risk rating associated with the first vendor; and
- iteratively compare the composite risk rating associated with the first vendor with the one or more first risk thresholds.

19. A non-transitory computer-readable storage medium for using an apparatus for performing dynamic risk compliance management in establishment of an online session, the non-transitory computer-readable storage medium storing instructions that, when executed, cause the apparatus to:
- receive a request to a establish an authenticated online session, where the authenticated online session is established upon completion of at least a first session establishment process and a second establishment process;
- obtain one or more first confidence factors for the first session establishment process, wherein the one or more first confidence factors are representative of a first vendor performing the first session establishment process;
- determine if the one or more first confidence factors satisfy one or more first risk thresholds;
- in an instance where the one or more first confidence factors satisfy the one or more first risk thresholds, modify one or more second risk thresholds representative of a second session establishment process performed by a second vendor;
- obtain one or more second confidence factors for the second session establishment process, wherein the one or more second confidence factors are associated with the second vendor performing the second session establishment process;

determine if the one or more second confidence factors satisfy the modified one or more second risk thresholds; and in an instance in which the one or more second confidence factors satisfy the modified one or more second risk thresholds, establish, the authenticated online session.

* * * * *